July 10, 1934.  C. W. VOGT  1,965,619
APPARATUS FOR FORMING SHAPED BODIES OF ICE CREAM
Filed Sept. 26, 1931  4 Sheets-Sheet 1

INVENTOR
Clarence W. Vogt
BY
ATTORNEYS

July 10, 1934.  C. W. VOGT  1,965,619

APPARATUS FOR FORMING SHAPED BODIES OF ICE CREAM

Filed Sept. 26, 1931    4 Sheets-Sheet 2

INVENTOR
Clarence W. Vogt
BY
ATTORNEYS

July 10, 1934. C. W. VOGT 1,965,619
APPARATUS FOR FORMING SHAPED BODIES OF ICE CREAM
Filed Sept. 26, 1931  4 Sheets-Sheet 3

INVENTOR
Clarence W. Vogt
BY
ATTORNEYS

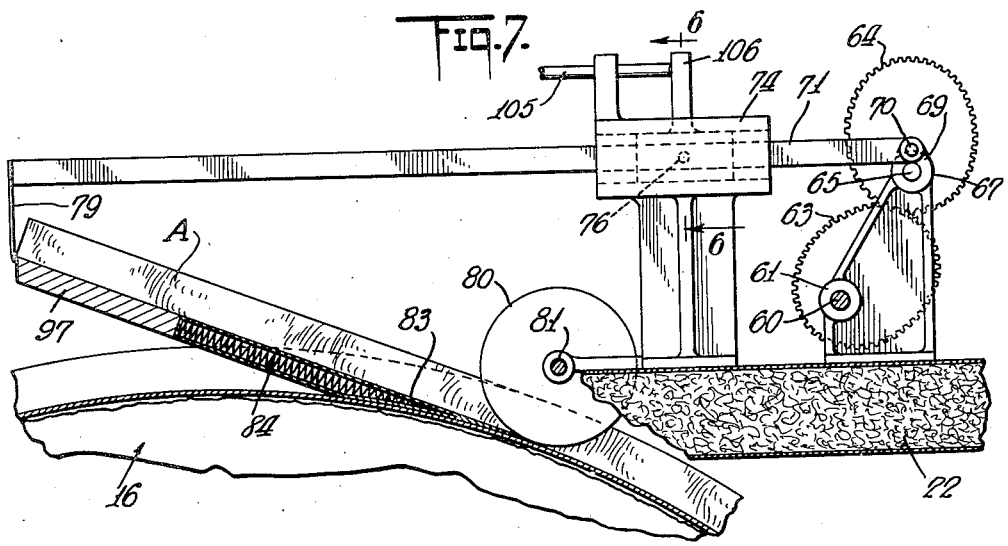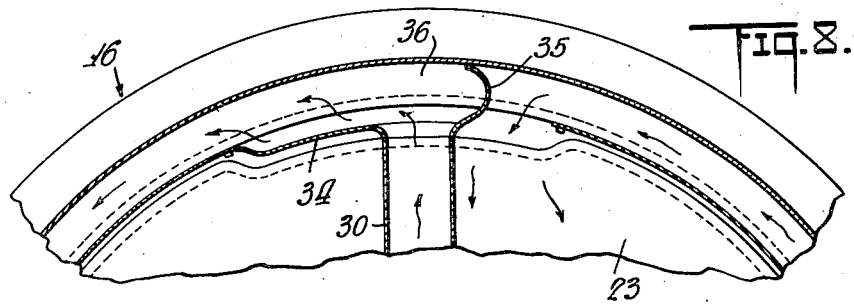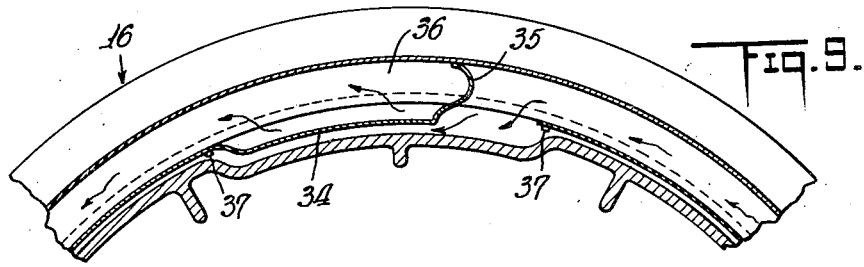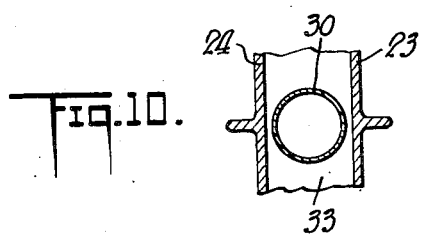

Patented July 10, 1934

1,965,619

UNITED STATES PATENT OFFICE 1,965,619

APPARATUS FOR FORMING SHAPED BODIES OF ICE CREAM

Clarence W. Vogt, Louisville, Ky., assignor, by mesne assignments, to Vogt Processes Incorporated, Louisville, Ky., a corporation of Delaware Application September 26, 1931, Serial No. 565,257

17 Claims. (Cl. 257—96)

This invention relates to apparatus for processing liquid, semi-liquid, or plastic materials, or mixtures to increase the stiffness thereof, by causing the crystallization or solidification of a portion of the ingredients thereof.

As example of products in connection with which the invention is particularly advantageous, I may mention ice cream, water ice, sherbet, and the like.

In processing such commodities, such as ice cream for example, it is desirable to effect the hardening or setting of the product as rapidly as is practicably possible without undue agitation or disturbance of the product, after the proper and desired amount of air has been incorporated therein, and after the product has been previously partially frozen to a sufficiently stiff state to hold the incorporated or whipped-in air.

In my prior Patent 1,733,740, I disclose a type of freezing apparatus in which a partially frozen product is spread on to the outside of a drum or roll in a relatively thin layer, whereby this layer rapidly hardens by the action of the refrigerant applied to the inside surface of the roll.

In my co-pending application Serial No. 492,727 filed November 1, 1930, (Fig. 6), there is disclosed a roll type of heat treatment apparatus having multiple corrugations or channels which may be filled with material to be treated, said material being acted upon by the refrigerant in the annular spaces between the channels.

While the apparatus shown in my above mentioned patent and co-pending application may be used to advantage in connection with the freezing, crystallizing and chilling of ice cream, or other commodities, the present invention results in advantages in the processing of certain commodities as will be evident from a study of the apparatus shown in the drawings, and from the following description thereof.

As one important feature of the invention, a liquid, semi-liquid, or plastic material is frozen or hardened or solidified in a refrigerated channel, and after such hardening has taken place, the material is removed in the form of slabs or bars which may be cut into desired and uniform lengths.

As a further feature of the invention, the apparatus is so designed that no belts are required, and a large amount may be hardened per hour in an apparatus occupying the minimum of floor space.

The lengths are preferably comparatively short because any curvature because of the contour of the periphery of the roll will be less, the shorter the section. Unless the rollers are very large in diameter, this curvature would require the reforming or straightening of the sections to a greater extent if the sections be of very considerable lengths. This, however, would be unnoticeable on portions of relatively short lengths, for instance lengths not in excess of 10° or 1/36th of the total circumference of the roll.

In the manufacture of ice cream, it is to be understood that this is not regarded as a limitation of length in view of the fact that ordinarily ice cream has a sufficient amount of unfrozen water even at a temperature of 0° F. to permit it to be formed or bent to a considerable degree without perceptible fracturing. Products such as water ices, do not have as high a percentage of incorporated air or fat constituent, and are much more brittle after being hardened to such temperature.

It has heretofore been proposed to refrigerate, chill or freeze ice cream, while being conveyed between a pair of endless belts which are subjected to refrigeration. Such type of apparatus must of necessity occupy considerable space in proportion to the amount of material being handled. Such type of apparatus in practice requires wrapping, or otherwise encasing the material to prevent the squeezing or leaking out or loss of material.

In the accompanying drawings, I have illustrated one form which my invention may assume, but other forms may be easily designed within the scope of my invention.

In these drawings:

Fig. 4 is an enlarged longitudinal section of one of the spreading elements for delivering material to the roll.

Fig. 5 is a sectional detail taken on the line 5—5 of Fig. 1.

Fig. 6 is a sectional detail of a part of the cut-off mechanism taken on the line 6—6 of Fig. 7.

Fig. 7 is a side elevation of the cut-off mechanism.

Fig. 8 is a partial vertical section taken on the line 8—8 of Fig. 3, and showing one method of attaching the baffle to the multi-channel-shaped roll.

Fig. 9 is a similar view of Fig. 8 taken on the line 9—9 of Fig. 3, and

Fig. 10 is a partial section taken on the line 10—10 of Fig. 3.

Figure 1:
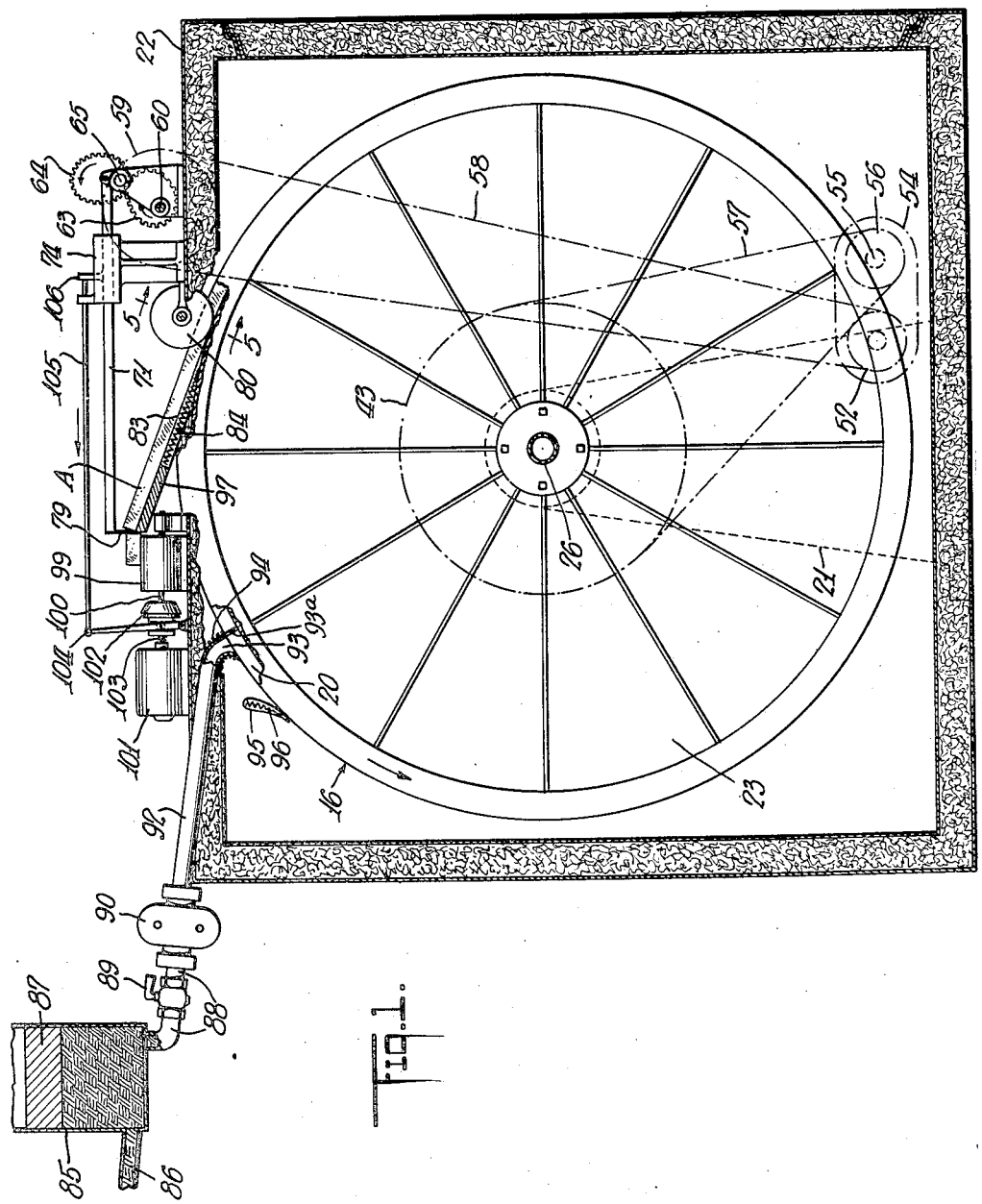
Fig. 1 is a central vertical section of one form of apparatus embodying the invention, certain of the parts being somewhat diagrammatically shown.

In the illustrated embodiment of the present invention, I provide an internally cooled or refrigerated roll, drum or conveyor 16 which is provided with annular spaced parallel flanges 19 on the periphery, connected alternately at their inner and outer edges to form annular grooves or spaces 20 facing outwardly for the material, and annular inwardly facing grooves receiving the refrigerant. The drum 16 is trunnioned on a suitable frame 21, and the bottom, sides, ends and a portion of the top of the drum are enclosed in a suitable insulated casing 22. This casing may be provided with suitable cleanout doors.

The interior of the casing 22 may be additionally refrigerated by the continuous introduction and removal of a cold gas such as air, or by the usual expedient of refrigerating coils mounted within the chamber. While it is obvious that additional refrigeration may be readily supplied, it is not considered necessary in view of the considerable amount of exposed refrigerating surface of the drum, which serves to maintain the interior of the chamber sufficiently cold for the purpose.

The drum 16 is provided with enclosing ends 23 and 24 which are of such shape as to eliminate excessive volume of the cooling fluid. The end 24 is provided with a hollow trunnion 25 for receiving the inlet pipe 26 for the cooling medium. This pipe projects a sufficient distance into the trunnion to permit the packing thereof by suitable packing 27, packing gland 28, and gland bolts 29. Projecting into this trunnion, but from the opposite end, is a delivery conduit 30 having a radially extending portion between the ends 23 and 24. Between the inlet pipe 26 and the delivery conduit 30, is a metallic sleeve 31, and surrounding the conduit 30 and a short distance from its end is a second packing 32. Applying of pressure to gland 28 by means of bolts 29 causes the sealing of both of the packings 27 and 32. The packing 27 serves to prevent the leakage of the cooling fluid out of the system, and the packing 32 serves to prevent the leakage of fluid around the delivery pipe 30 and into the spaces 33 between the ends 23 and 24.

The delivery conduit 30 connects with a circumferentially extending baffle 34 spaced a short distance from the periphery of the drum 16 so as to form a passage for the distribution of the cooling fluid along the interior surface of the drum. Fingers 35 are connected to one end of the baffle 34 and extend into the grooves 36 formed in the inner surface of the drum 16 between the flanges 19. They form therewith a seal or partition in the passageway to force the liquid to flow in the direction of the arrows (Figs. 3, 8 and 9).

The baffle 34 is fastened to the interior of the drum 16 by means of suitable screws 37 and serves to confine the cooling fluid adjacent the interior periphery of the drum 16, and particularly within the grooves 36 so as to cause the rapid circulation of the liquid, thereby causing a high heat transfer rate between said liquid and the surfaces defining the external channels 20 of the drum. The baffle 34 does not extend completely around the interior periphery of the drum, but ends a short distance from the fingers 35 as shown in Figs. 8 and 9. This provides egress for the temperature changing fluid which is then delivered through the space 33 between the walls 23 and 24 and into a hollow trunnion 38 of the end wall 23. This hollow trunnion 38 is provided with a packing 39, gland 40 and bolts 41 which serve to prevent the leakage of the outgoing fluid from around the outlet pipe 42.

Figure 3:
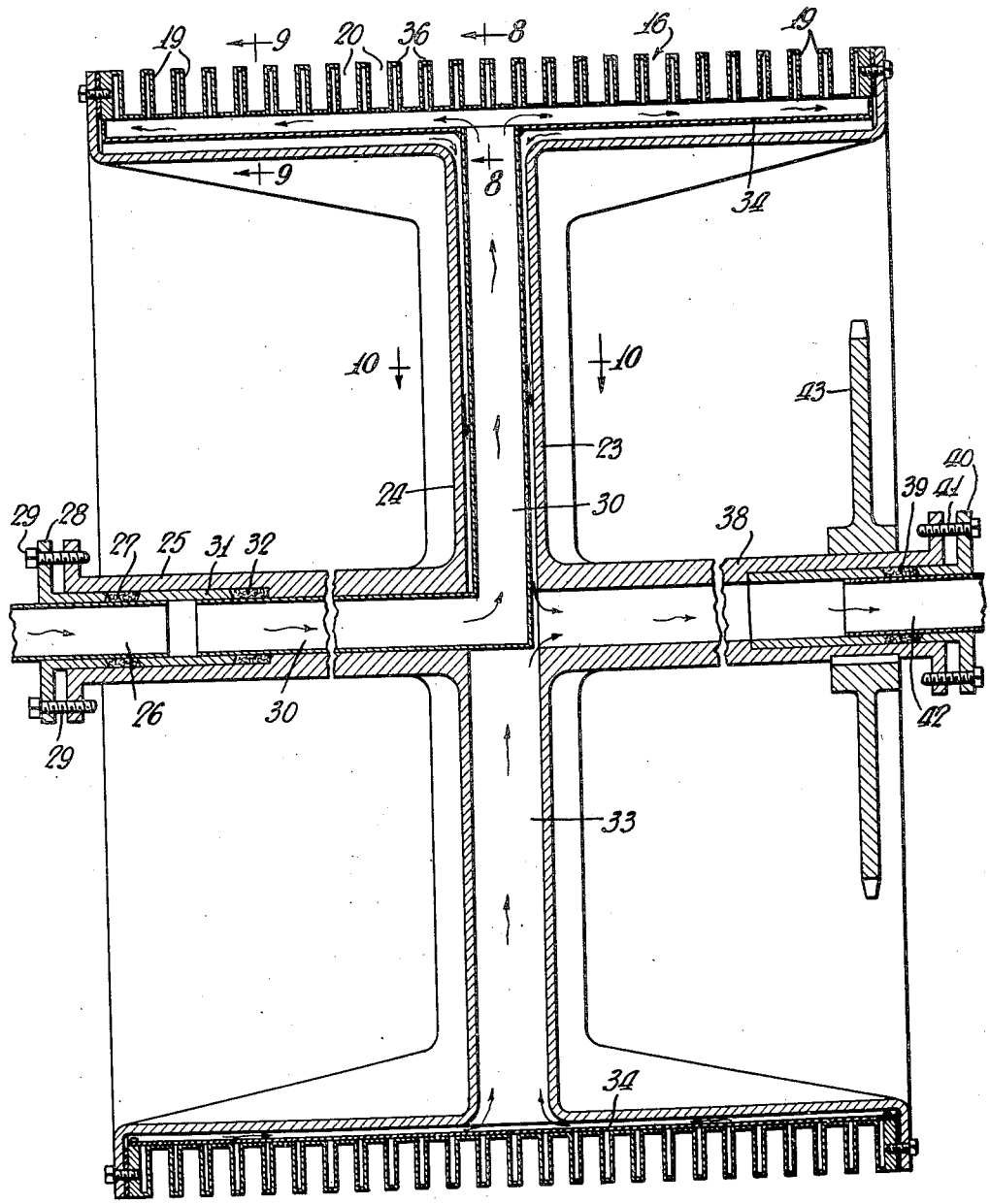
Fig. 3 is a central longitudinal section of the roll with multiple corrugators or channels.

It will be noted from Fig. 3 that a portion of the hollow trunnions 25 and 38 has been broken away from convenience. It is preferable that these trunnions extend outside of the casing 22 for convenience in rigidity of mounting in the frames 21 which are also outside of the casing. A sprocket 43 for rotating the drum is rigidly fixed to the hollow trunnion 38 for instance by means of keys and set screws not shown. It will be understood that the inlet pipe 26 and the outlet pipe 42 are preferably held stationary, while the drum and its fittings are rotated.

The inlet pipe 26 is supplied with the desired cooling medium from any suitable source, not shown, and the outlet pipe 42 preferably returns such medium to its source. Where the refrigerant employed is, for example, brine, the inlet pipe is connected to the discharge from a brine cooler, and the outlet pipe is connected to return the refrigerant from the drum to the brine cooler for recooling or recirculation.

It is desirable that the radial extension of the conduit 30 be insulated from the cooling liquid in the space 33. As an example of such insulation, I may employ a pipe section of large diameter surrounding the conduit 30, and welded thereto at its ends, such surrounding conduit being large enough to provide an air space between its inner surface and the outer surface of the conduit 30. This specific construction is not essential and has not been shown.

Figure 2:
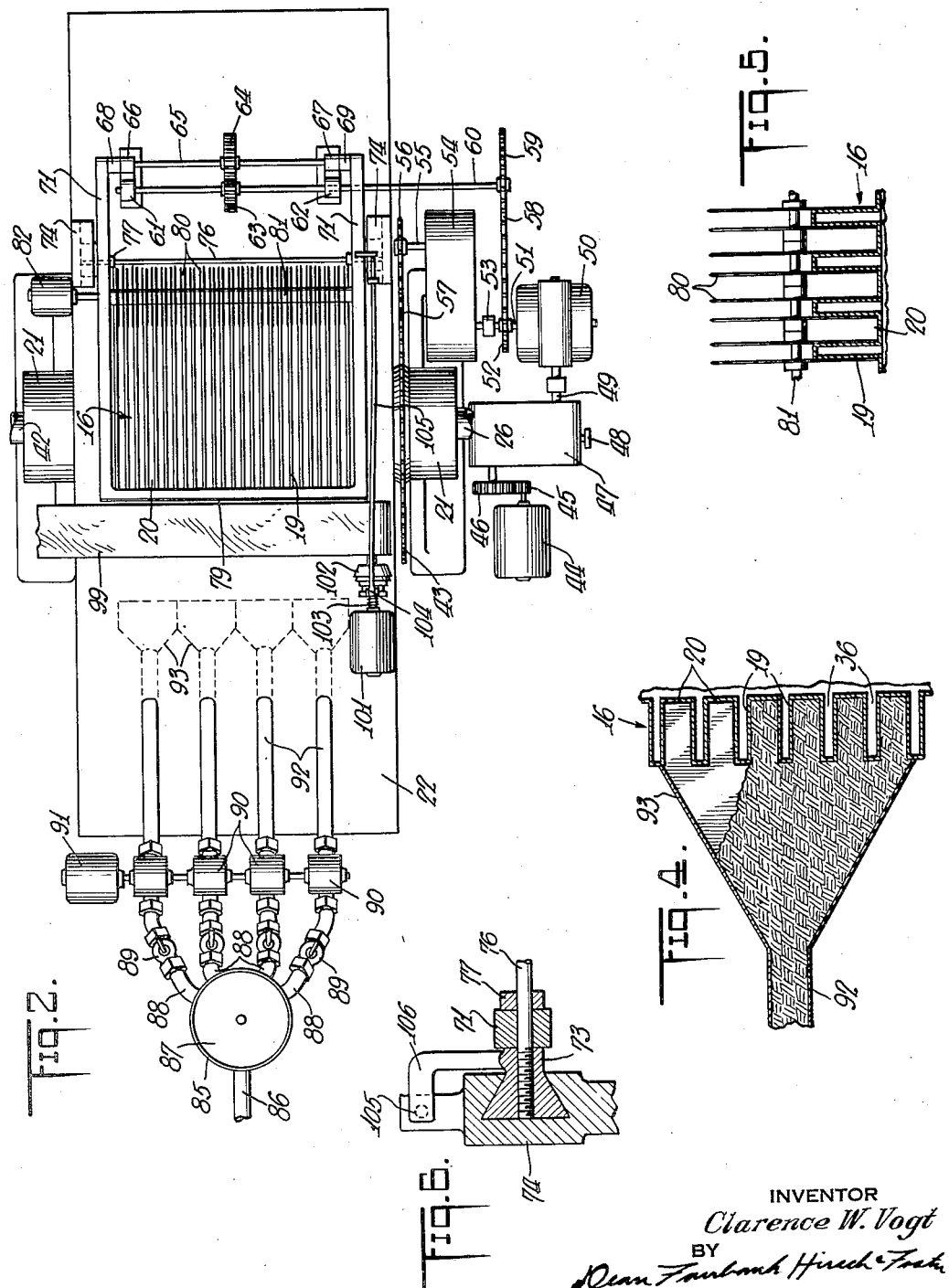
Fig. 2 is a plan view taken of the apparatus shown in Fig. 1.

For rotating the drum, I have shown (Fig. 2) a main driving motor 44 connected by suitable reduction gears 45 and 46 to a variable speed transmission unit 47. This speed transmission unit may be similar to that known as the "Reeve" transmission which is well known in the art. The variation in speed is obtained by the adjusting screw 48 located on the exterior of the transmission unit 47. To the driven shaft 49 of the variable speed transmission is connected a speed reduction unit 50, this unit providing for a reduction in speed of approximately 200:1. On the slow speed or delivery shaft 51 extending from the speed reduction unit 50 is mounted a sprocket 52. Connected to the extension shaft of a suitable coupling 53 is a second speed reducer 54, the second speed reducer providing a further reduction in speed in the order of approximately 15:1. Connected to the reduced speed shaft 55 of the reducer 54 is a sprocket 56 having a driving connection such as a chain 57, with the sprocket 43 mounted on the trunnion 38.

The sprocket 52 serves to drive the cut-off mechanism and is connected by means of a chain 58 to a sprocket 59 which is fixedly mounted, and which has a driving connection with a shaft 60 mounted in bearings 61 and 62. Between these bearings, the shaft 60 has keyed thereon an elliptical gear 63 (Fig. 7) which in turn drives a similar elliptical gear 64 which is fixed to a shaft 65. The shaft 65 is mounted in bearings 66 and 67, and on its ends are mounted cranks 68 and 69, each provided with a crank pin 70. The crank pins 70 are each connected to one end of a lever 71. The intermediate portions of the levers 71 are fastened to pins mounted in cross-heads 73, guided in cross-head guides 74. A brace rod 76 connects the two levers as a stiffening member, and may serve as the pin upon which the levers are pivoted. The levers may be maintained at the upper distance apart by means of collars 77, and have mounted at their free ends a transverse cutter 79 preferably made of stainless steel or other suitable hard substance.

Mounted near the top of the roll 16, and parallel to the axis of said roll, are a series of cutter disks 80 arranged in pairs, the disks of each pair being spaced apart so that there is a disk operating closely adjacent to each side of each groove or space 20. The disks extend practically to the bottom of the grooves, merely leaving sufficient clearance between the edge of the disk and the bottom of the groove to prevent metal contact. The pairs of disks are mounted in the manner of gang cutters on a shaft 81 which is connected to the motor 82 for rapid rotation. By the rotation of these disks, the material adhering to the side surfaces of the grooves 20 is cut free of these surfaces.

The material is removed from the bottoms of the grooves by cutters 83 which extend into each of the grooves 20. The top surface of the cutter is so positioned as to be approximately tangential to the bottom of the groove 20. In order to insure the column of material against adhering to the cutters 83, each of these cutters is preferably provided with an electric heating element 84 which serves to maintain the top surface of the cutter 83 at a slightly warmer temperature than that of the product on which it is operating, although at a low temperature compared to the average outside temperature.

The partially frozen and whipped ice cream is supplied through a conduit 86 to a hopper or container 85, and from any convenient source, for instance from a continuous freezer constructed as shown in any one of my Patents 1,783,864, 1,783,865, or 1,783,867. In such a freezer, the material may be subjected to the required refrigeration, advanced as a comparatively thin layer, while beaten, agitated and whipped in such layer, and thereafter forced directly through the conduit 86 into the container 85 under sufficient pressure to prevent the forming of air voids, and to insure uniform and continuous flow.

Preferably, there is a weight 87 in the container 85, and arranged to maintain the pressure on the material. The principle purpose of the container 85 is t give a degree of flexibility in the operation. Inasmuch as the supply of material through the conduit 86 is at a lesser rate than that at which the material is being withdrawn, the adjustment may be made either, for instance, by increasing the rate of the flow to the container, or by reducing the rotational speed of the drum 16 by the adjustment of the variable speed unit 47. Prior to each adjustment, the weight may gradually rise or drop as the quantity in the container increases or decreases.

From the bottom of the container 85, the material is drawn and forced into conduits 88 to metering and distributing pumps 90. In each conduit 88 is placed a stop cock 89, so that if it is desired, either may be cut out of service or the supply to any pump may be slightly reduced by partially closing the cock 89. The pumps 90 are arranged to be driven either directly or by suitable gearing from any suitable source of power, such for instance as the motor 91. Each pump forces the amount metered thereby through a conduit 92 to a spreader 93 which delivers the product into the grooves 20.

I have shown the spreaders 93 as covering the grooves 20. Obviously, these spreaders may be arranged to take a greater or lesser number of grooves depending on the size and stiffness of the material which it is desired to deliver and spread. In order to prevent the spreader nozzle from gradually becoming clogged due to the refrigerating action which it may receive from its proximity or contact with the flanges 19, I provide a heating element 94 to counteract this tendency, this heating element supplying sufficient heat to compensate for such refrigerating action. The spreaders 93 have portions 93a thereof, forming tongues extending respectively in the grooves 20 and serving as baffles to prevent the spreading of the delivered material towards the rear of the advancing grooves.

The roll 16 is rotated by means of the gearing as hereinbefore described, and in the direction as shown by the arrows (Fig. 1). This, together with the feeding action of the pumps, causes the deposition of the material in the spaces 20.

In connection with the freezing of ice cream where the material delivered to the grooves is quite stiff requiring the force of several pounds of pressure per square inch to deliver the same, there is a tendency for the air content to cause the expansion of the material upon the release of this pressure. In order to maintain the grooves exactly full and prevent this expansion from causing an unequal or excessive thickness of the finished product, I have provided a wiper 95 which is preferably provided with a heating element 96 to compensate for the refrigerating action to which this wiper is subjected because of the contact with the outer edges of the flanges 19. After this pressure has been released, I have found that after any bulging takes place, the wiping action above described will be sufficiently effective, and that after any excess is forced back into the groove 20, there will be no appreciable expansion due perhaps to the stiffness of the cream which is already being acted upon by the refrigerant.

The rotational speed of the drum is dependent upon the temperature of the refrigerant supplied to the grooves 36 of the roll 16, and also obviously upon the width of the grooves 20. Where these last mentioned grooves are 1¼ inches wide, for example, and with the temperature of the refrigerant in the grooves 26 approximately —20° F., the partially frozen ice cream delivered to the roll will be hardened to an average temperature throughout the mass, of —5° F. in approximately fifteen minutes. Of course, this time is dependent to a great measure upon the degree of stiffness of the product delivered to the roll, the percentage of overrun in the product, the sugar content, and many other factors such as the velocity of the refrigerant in the grooves 36. Provided the grooves are only ⅝ inch wide, the time required to insure the same degree of hardness, will be approximately four to five minutes. It will thus be seen that the grooves must travel at a relatively low peripheral speed to effect the hardening in one revolution. Where the time require to harden is approximately fifteen minutes, the speed of the roll will be slightly less than four revolutions per hour, and the grooves 20 filled around nearly the entire drum periphery, and empty for approximately 1/12 of the circumference.

When the product reaches the space opposite the revolving disks 80, it is cut loose from the side surface of the grooves, and at about the same time or shortly thereafter the bottom surface is cut loose from the bottom part of the grooves by means of the cutter 83. The continuous rotation of the drum 16 causes the bar A of the hardened ice cream to be pushed and moved vertically along the inclined slide 97.

The product which has been subjected to the refrigerating action while in the grooves 20, will be substantially harder along the sides than in the center of the bar and this temperature continues to equalize throughout the mass as the loose bar advances towards the knife 79.

The cutting action of the disks causes the compression or compacting of the ice cream, and consequently the narrowing of the width of the bar to approximately the dimension of the space between the coacting pairs of disks 80. This slight loss in volume may be compensated for in the primary freezing unit, by causing the product delivered from the primary freezer unit to be of slightly higher overrun than that desired in the final product.

The type of cutter mechanism which I have disclosed is one which permits the cutting of the bar product A without stopping the rotational movement of the drum 16. The length of the units cut from the bar is determined by the relative diameters of the sprockets 52 and 59. With the particular gearing arrangement shown and described herein, the product will be cut in lengths of approximately three inches each. Provided a shorter cut is desired, this may be obtained by increasing the diameter of the sprocket 52, and/or decreasing the diameter of the sprocket 59, and if longer cuts are desired, the sprocket 52 may be made smaller, and the sprocket 59 may be made larger.

I prefer to use elliptical gears in order that the cutting may be accomplished in a relatively short period, thereby causing square cuts through the material. As the sections are cut from the bar, they fall on the belt 99 which is driven by pulleys mounted on shaft 100 which is in turn activated by the motor 101 through the clutch 102. With the arrangement shown, I have provided for intermittent declutching, so that the belt will not be in motion when the segments are deposited on the belt. As shown, this takes place by means of a dog 106 which is mounted on the knife lever 71 abutting against the end of a rod 105 which is connected to the clutch lever 104, and as this dog 106 advances from a point midway of the stroke of the knife mechanism, the rod 105 is in contact with and is being moved in the direction of the member effecting the declutching.

As soon as the rotation of the driving gears 63 and 64 is continued, and upon the movement of the levers 71, the clutch again becomes engaged by the driving action of the member 103 mounted on the motor shaft. This permits the series of segments which have been cut off to be advanced to the wrapping or cartoning mechanism, not shown.

This apparatus is particularly adapted for the making of unit portions of ice cream as well as for the manufacture of chocolate coated frozen confection. An increase in density of the bars at the surface due to the action of the cutters 80 hereinbefore described, is of advantage in the production of the chocolate coated bars, inasmuch as a greater reisity at the surface causes the solidification of the coating with a minimum of melting of the edges of the ice cream or frozen center.

Having thus described my invention, what I claim as new and desire to secure by Letters Patent is:—

1. An apparatus for forming shaped bodies of hardened ice cream, which includes an endwise movable, refrigerated open channel, means for delivering partly frozen aerated ice cream under pressure to said channel, whereby upon release of pressure, the ice cream tends to expand out of the channel, and a member extending across the open side of said channel adjacent to the delivery means, for returning to said channel the ice cream expanding therefrom.

2. An apparatus for treating a liquid or semi-liquid material to change its condition, which includes an open channel, means for advancing said channel, means for delivering the material to said channel, means for lowering the temperature of said material in said channel, a stationary wiper extending across the open side of said channel, and adapted to confine said material in said channel, as said material passes said wiper, and means for maintaining the temperature of said wiper slightly above the freezing temperature of said material.

3. An apparatus for delivering a liquid or semi-liquid material to change its condition, which includes a rotatable refrigerated drum having a channel on the periphery thereof, means for delivering material to said channel, and frigerated material to separate it from the adjoining walls of said channel, and means adjacent to said second mentioned means for effecting the delivery of said material from said channel.

4. An apparatus for treating a liquid or semi-liquid material to change its condition, which includes a channel, means for advancing said channel, means for lowering the temperature of said material in said channel to harden said material, and means for cutting one or more sides of the material in said channel to separate said material from the adjoining walls of said channel after said material has been partially solidified, so that the delivery of said material from said channel is facilitated.

5. An apparatus for treating a liquid or semi-liquid material to change its condition, which includes a channel, means for continuously advancing said channel, means for lowering the temperature of said material in said channel to substantially solidify said material, means for cutting the sides of the solidified material in said channel to separate said material from the adjoining walls of said channel while said channel is advancing, and means adjacent thereto for removing the material from the channel.

6. An apparatus for treating a liquid or semi-liquid material to change its condition, which includes a channel, means for delivering the material to said channel, means for advancing said channel, means for cooling the material in said channel to a temperature sufficient to partially solidify the same, and means for delivering the partially solidified material from said channel, and including a pair of disks mounted adjacent the side walls of said channel, and adapted to cut through the material as said material and its confining channel walls are passed through the field of operation of said disks.

7. An apparatus for treating a liquid or semi-liquid material to change its condition, which includes a rotatable refrigerated drum for partially solidifying the material, and having a channel on the periphery thereof, and means for delivering the partially solidified material from said channel, and including a pair of rotatable disks extending into said channel, and disposed proximate the side walls of said channel to separate the main bulk of the partially solidified material from said side walls.

8. An apparatus for treating a liquid or semi-liquid material to change its condition, which includes a channel, means for advancing said channel, means for delivering the material to be treated into said channel, means for lowering the temperature of said material in said channel to partially solidify said material, and means for delivering the partially solidified material from said casing in bar form, and including means for cutting the sides of said partially solidified material from the side walls of said channel, and means for cutting said partially solidified material from the bottom wall of said channel.

9. An apparatus for treating a liquid or semi-liquid material to change its condition, which includes a channel, means for advancing said channel, means for delivering the material to said channel, means for lowering the temperature of said material to partially solidify the same, and means for continuously delivering the partially solidified material from said channel in bar form, and including means for progressively cutting the sides and bottom of the partially solidified material to separate the same from the side and bottom walls of said channel, and means for cutting said bars into sections without interfering with the continuous delivery of the partially solidified material.

10. An apparatus for treating a liquid or semi-liquid material to change its condition, which includes a channel, means for advancing said channel, and means for delivering the material to said channel, and including a conduit having a portion of the side thereof extending inside said channel to serve as a baffle against the spreading of the delivered material towards the rear of said advancing channel.

11. An apparatus for treating a liquid or semi-liquid material to change its condition, which includes a plurality of parallel channels, means for continuously advancing said channels, a conduit for delivering the material, means for forcing said material through said conduit under pressure, and a flared conduit connected to said first mentioned conduit, and adapted to spread the material into a plurality of said channels, and having a portion of one side thereof formed into tongues which extend into said channels, and which serve as baffles against the spreading of the delivered material towards the rear of said advancing channel.

12. An apparatus for treating a liquid or semi-liquid material to change its condition, which includes a rotatable refrigerated drum having a channel on the periphery thereof, means for delivering the material to said channel, and means for delivering the material from said channel in semi-solid slabs, and including a cutter having a surface extending tangentially from the base of said channel, and a pair of rotatable disks disposed adjacent the side walls of said channel, and extending partially in said channel to sever the sides of the main bulk of the semi-solid material from the side walls of said channel.

13. An apparatus for treating a liquid or semi-liquid material to change its condition, which includes a channel, means for continuously advancing said channel, means for delivering the material to said channel, means for lowering the temperature of said material in said channel to harden the material, means for continuously delivering the material in bar form from said channel, means for cutting said bar into sections during the continuous advancement of said bar, a conveyor receiving the sections as they are being cut, and means for stopping the movement of said conveyor prior to each cutting of said bar.

14. An apparatus for treating a liquid or semi-liquid material to change its condition, which includes a channel, means for continuously advancing said channel, means for delivering the material to said channel, means for lowering the temperature of the material in said channel to harden the material, means for continuously delivering the hardened material in the form of a bar from said channel, means for cutting said bar into successive bricks without interfering with the continuous advancement of said bar, a conveyor, a clutch for driving said conveyor, and means for engaging or disengaging said clutch in accordance with the operation of said bar cutting means.

15. An apparatus for forming shaped bodies of a comestible, which includes an internally refrigerated rotatable drum having a plurality of annular parallel channels encircling the same, means for delivering the material in liquid or plastic condition to said channels, a plurality of cutters extending into said channels closely adjacent to the side walls thereof, and a plurality of members extending one into each of said channels substantially tangential to and terminating adjacent to the inner wall thereof and between said cutters for separating the hardened material from the bottom of the channel and directing it away from the drum.

16. An apparatus for treating a liquid or semi-liquid material to at least partially solidify the same, which includes a rotatable internally refrigerated drum having a plurality of parallel annular channels on the periphery thereof, a nozzle terminating adjacent to the periphery of the drum and having tongues projecting into said channels and serving as baffles to prevent spreading of the delivered material toward the rear of the advancing channels, and a plurality of cutters projecting one into each of said channels and disposed substantially tangential thereto for removing the material hardened in said channels.

17. An apparatus for treating a liquid or semi-liquid material to at least partially solidify the same, which includes a rotatable internally refrigerated drum having a plurality of parallel annular channels on the periphery thereof, a nozzle terminating adjacent to the periphery of the drum and having tongues projecting into said channels and serving as baffles to prevent spreading of the delivered material toward the rear of the advancing channels, a plurality of cutters projecting one into each of said channels and disposed substantially tangential thereto for removing the material hardened in said channels, and means adjacent to the inner end of each cutter for separating the material from the side walls of the channels.

CLARENCE W. VOGT.